United States Patent
Kitani et al.

(10) Patent No.: US 12,045,023 B2
(45) Date of Patent: Jul. 23, 2024

(54) ELECTRONIC CONTROL DEVICE AND NEURAL NETWORK UPDATE SYSTEM

(71) Applicant: HITACHI AUTOMOTIVE SYSTEMS, LTD., Hitachinaka (JP)

(72) Inventors: Mitsuhiro Kitani, Tokyo (JP); Michimasa Kitahara, Tokyo (JP); Tsuneo Sobue, Tokyo (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 740 days.

(21) Appl. No.: 17/270,512

(22) PCT Filed: Aug. 22, 2019

(86) PCT No.: PCT/JP2019/032837
§ 371 (c)(1),
(2) Date: Feb. 23, 2021

(87) PCT Pub. No.: WO2020/054345
PCT Pub. Date: Mar. 19, 2020

(65) Prior Publication Data
US 2021/0333764 A1   Oct. 28, 2021

(30) Foreign Application Priority Data
Sep. 10, 2018   (JP) .................. 2018-168864

(51) Int. Cl.
*G05B 13/02*   (2006.01)
*G05D 1/00*   (2024.01)
(Continued)

(52) U.S. Cl.
CPC ......... *G05B 13/027* (2013.01); *G05D 1/0088* (2013.01); *G05D 1/0221* (2013.01);
(Continued)

(58) Field of Classification Search
CPC .. G05B 13/027; G05D 1/0088; G05D 1/0221; G06N 3/02; G06N 3/04;
(Continued)

(56) References Cited

U.S. PATENT DOCUMENTS

| 5,636,327 A | 6/1997 | Nakahira et al. |
| 2018/0032835 A1 | 2/2018 | Shirahata |

(Continued)

FOREIGN PATENT DOCUMENTS

| JP | 06-060051 A | 3/1994 |
| JP | 2018-018350 A | 2/2018 |

OTHER PUBLICATIONS

International Search Report, PCT/JP2019/032837, Nov. 5, 2019, 1 pg.

(Continued)

*Primary Examiner* — Shane D Woolwine
(74) *Attorney, Agent, or Firm* — Volpe Koenig

(57) ABSTRACT

An electronic control device is an electronic control device that stores a neural network including plural neurons and a connection information group including plural pieces of connection information that associate the neurons with each other. The neural network is a neural network including a third connection information group created through deletion, by a pruning section, of at least one piece of connection information from a first connection information group for deciding an output value when an input value is given on the basis of the first connection information group and a second connection information group that is plural pieces of connection information having the degree of influence on predetermined data given as the input value, the degree of influence exceeding a predetermined value.

10 Claims, 15 Drawing Sheets

(51) Int. Cl.
　　　*G06N 3/045*　　　(2023.01)
　　　*G06N 3/08*　　　(2023.01)
　　　*G06N 3/082*　　　(2023.01)

(52) U.S. Cl.
　　　CPC ............. *G06N 3/045* (2023.01); *G06N 3/08* (2013.01); *G06N 3/082* (2013.01)

(58) Field of Classification Search
　　　CPC .......... G06N 3/044; G06N 3/045; G06N 3/08; G06N 3/082; G06N 20/00; G06N 20/10; G06N 20/20
　　　See application file for complete search history.

(56) References Cited

U.S. PATENT DOCUMENTS

2018/0096249 A1　　4/2018　Kim et al.
2019/0188567 A1*　6/2019　Yao ..................... G06N 3/082
2019/0362235 A1*　11/2019　Xu ..................... G06N 3/084

OTHER PUBLICATIONS

Han, Song [et al.]: Learning both Weights and Connections for Efficient Neural Networks. arXiv preprint arXiv:1506.02626, 2015.
Cheng, Yu [et al.]: A Survey of Model Compression and Acceleration for Deep Neural Networks. arXiv preprint arXiv:1710.09282v5, 2017.
Thimm, Georg; Fiesler, Emile: Pruning of Neural Networks. IDIAP Research Report. 1997.
Reed, Russell: Pruning Algorithms—A Survey. IEEE transactions on Neural Networks, 1993, 4. Jg., Nr. 5, S. 740-747.

\* cited by examiner

FIG.3

| DATA TYPE | PRIORITY DETERMINATION CONDITION | | PRIORITY | OPERATION COEFFICIENT |
|---|---|---|---|---|
| | RELATIVE DISTANCE d | LEADING VEHICLE FLAG | | |
| DATA 1 FOR OBJECT DETECTION | d<30 | TRUE | 3 | 2 |
| DATA 2 FOR OBJECT DETECTION | 100>d≧30 | TRUE | 2 | 1.5 |
| DATA 3 FOR OBJECT DETECTION | d≧100 | TRUE | 1 | 1 |
| DATA 4 FOR OBJECT DETECTION | d<500 | FALSE | 1 | 1 |

FIG. 6

| Data Type | Priority Determination Condition | | Priority | DNN Weight |
|---|---|---|---|---|
| | Object Class for Classification | Object Height | | |
| Data 1 for Object Classification | Vehicle, Pedestrian, or Bicycle | — | 3 | 2 |
| Data 2 for Object Classification | Still Object other than Vehicle, Pedestrian, and Bicycle | 20 cm ≦ Object < 50 cm | 2 | 1.5 |
| Data 3 for Object Classification | Still Object other than Vehicle, Pedestrian, and Bicycle | Object < 20 cm | 1 | 1 |

FIG.15

| THE NUMBER u OF ARITHMETIC UNITS GREATLY INVOLVED IN IMPORTANT DATASET | COMPRESSION RATE |
|---|---|
| $0 \leq u < 20$ | NORMAL COMPRESSION RATE |
| $20 \leq u < 40$ | NORMAL COMPRESSION RATE/2 |
| $20 \leq u < 40$ | NORMAL COMPRESSION RATE/3 |
| $40 \leq u$ | NORMAL COMPRESSION RATE/4 |

ELECTRONIC CONTROL DEVICE AND NEURAL NETWORK UPDATE SYSTEM

TECHNICAL FIELD

The present invention relates to an electronic control device and a neural network update system.

BACKGROUND ART

In recent years, development of autonomous driving systems has been activated. For traveling in a complicated traveling environment in the autonomous driving system, it is necessary to enhance functions such as "perception" in which sensing of the environment around the self-vehicle based on information from various sensors such as camera, laser radar, and millimeter-wave radar is carried out, "cognition" in which how objects around the self-vehicle detected by the sensors will act in the future is estimated, and "determination" in which action of the self-vehicle in the future is planned based on the perception and the cognition. Thus, further enhancement through introducing an AI (Artificial Intelligence) model such as a neural network or deep learning for these functions is expected. In the case of executing arithmetic processing of the neural network in real time at a processing cycle that can be used for vehicle traveling control in an electronic control device for a vehicle (ECU: Electronic Control Unit), not only a CPU but hardware devices such as FPGA (Field-Programmable Gate Array), ASIC (Application Specific Integrated Circuit), and GPU (Graphics Processing Unit) are additionally used in many cases, and increase in the power consumption of the ECU becomes a problem. For this reason, it is necessary to reduce the amount of arithmetic operation of the neural network and reduce the power consumption at the time of execution of the neural network. In patent document 1, an image recognizing device having the following characteristic is disclosed. The image recognizing device includes a recognition control unit, a memory amount calculating unit, and a learning control unit. The recognition control unit controls first recognition processing and second recognition processing. In the first recognition processing, processing of holding each of amounts of convolution calculated based on neuron data and parameters of an input image in a respective one of first memory areas and processing of holding, in a respective one of second memory areas, each of post-pruning amounts of convolution obtained by executing pruning processing for each of the amounts of convolution held in the respective one of first memory areas are executed in first plural layers. In the second recognition processing, processing of holding, in a respective one of fourth memory areas, each of output results obtained by integrating each of weights held in third memory areas with respect to all of the post-pruning amounts of convolution held in the second memory areas is executed in second plural layers. The memory amount calculating unit calculates each of a neuron data size that is the size of each neuron data and a parameter size that is the size of each parameter regarding each layer included in the first plural layers and the second plural layers. The learning control unit controls first learning processing in the second plural layers and second learning processing among the first plural layers. In the first learning processing, a gradient of an error in the output results calculated based on the output results held in the fourth memory areas is held in a fifth memory area. In addition, based on the magnitude relation between the neuron data size and the parameter size of each layer included in the second plural layers calculated by the memory amount calculating unit, a gradient of an error to the next layer in the second plural layers calculated based on the gradient of the error in the output results held in the fifth memory area or a gradient of an error held in the sixth memory area of the previous layer in the second plural layers is held in each sixth memory area. Thereafter, gradients of an error in the parameter to the next layer in the second plural layers are each held in the respective one of third memory areas. In the second learning processing, based on the magnitude relation between the neuron data size and the parameter size of each layer included in the first plural layers calculated by the memory amount calculating unit, a gradient of an error in the parameter to the next layer calculated based on a gradient of an error held in the sixth memory area of the last layer of the second plural layers or the seventh memory area of the previous layer in the first plural layers is held in each seventh memory area. Thereafter, gradients of an error to the next layer in the first plural layers are each held in the respective one of second memory areas.

PRIOR ART DOCUMENT

Patent Document

Patent Document 1: JP-2018-18350-A

SUMMARY OF THE INVENTION

Problem to be Solved by the Invention

In the invention described in patent document 1, when a weighting factor is deleted, the accuracy of inference on data for which inference with high accuracy is required lowers compared with that before the deletion of the weighting factor in some cases.

Means for Solving the Problem

An electronic control device according to a first aspect of the present invention is an electronic control device that stores a neural network including a plurality of neurons and a connection information group including a plurality of pieces of connection information that associate the neurons with each other. The neural network is a neural network including a third connection information group created through deletion, by a pruning section, of at least one piece of connection information from a first connection information group for deciding an output value when an input value is given on the basis of the first connection information group and a second connection information group that is a plurality of pieces of the connection information having the degree of influence on predetermined data given as the input value, the degree of influence exceeding a predetermined value.

A neural network update system according to a second aspect of the present invention is a neural network update system that includes a server and an electronic control device and updates a neural network including a plurality of neurons and a connection information group including a plurality of pieces of connection information that associate the neurons with each other. The server includes a storing part and an arithmetic part. The storing part stores a first connection information group for deciding an output value when an input value is given. The arithmetic part includes a coefficient identifying section that identifies a second connection information group that is a plurality of pieces of the connection information having the degree of influence on predetermined data, the degree of influence exceeding a predetermined value, when the predetermined data is given as the input value and a pruning section that deletes at least one piece of connection information from the first connection information group to create the third connection information group on the basis of the first connection information group and the second connection information group. The electronic control device stores a neural network including the third connection information group.

Advantages of the Invention

According to the present invention, the lowering of the accuracy of inference on data for which inference with high accuracy is required can be confined and the amount of arithmetic operation of a neural network can be reduced.

BRIEF DESCRIPTION OF THE DRAWINGS

FIG. 3 is a diagram illustrating one example of a dataset management table 30.

FIG. 6 is a diagram illustrating one example of a dataset management table 31 in modification example 1.

FIG. 15 is a diagram illustrating one example of a compression rate correction table 204.

MODES FOR CARRYING OUT THE INVENTION

Embodiments of the present invention will be described below with reference to the drawings. In the respective embodiments shown below, regarding the same constituent element, the same contents of processing, and so forth, the same number is described and description thereof is simplified. In the respective embodiments, in description about an electronic control device including an AI model using artificial intelligence processing, a server, and an overall system, explanation will be made with use of a neural network as one example of the AI model. However, the AI model may be machine learning, deep learning, and a model relating to reinforcement learning. That is, the respective embodiments to be described below can be applied to various AI models that can be optimized by approximation or pruning processing. In the embodiments to be described below, the optimization of a model will be described by taking a method of pruning weighting factors or neurons as an example, and the processing is described as "compression of a neural network." Furthermore, in the following, "neural network" is described as "NN" in some cases.

First Embodiment

A first embodiment of a neural network update system will be described below with reference to FIG. 1 to FIG. 5. In the first embodiment, connection information of a neural network that deeply relates to data for which inference with high accuracy is required (hereinafter, referred to also as "important dataset") is identified and pruning of the connection information is carried out by using the information. As the DNN pruning processing, a method of deleting the connection information itself and a method of changing a value to 0 are conceivable. The pruning is a way to reduce the size of neural network through compression and this is done after eliminating neurons and connections in neural network model.

Figure 1:
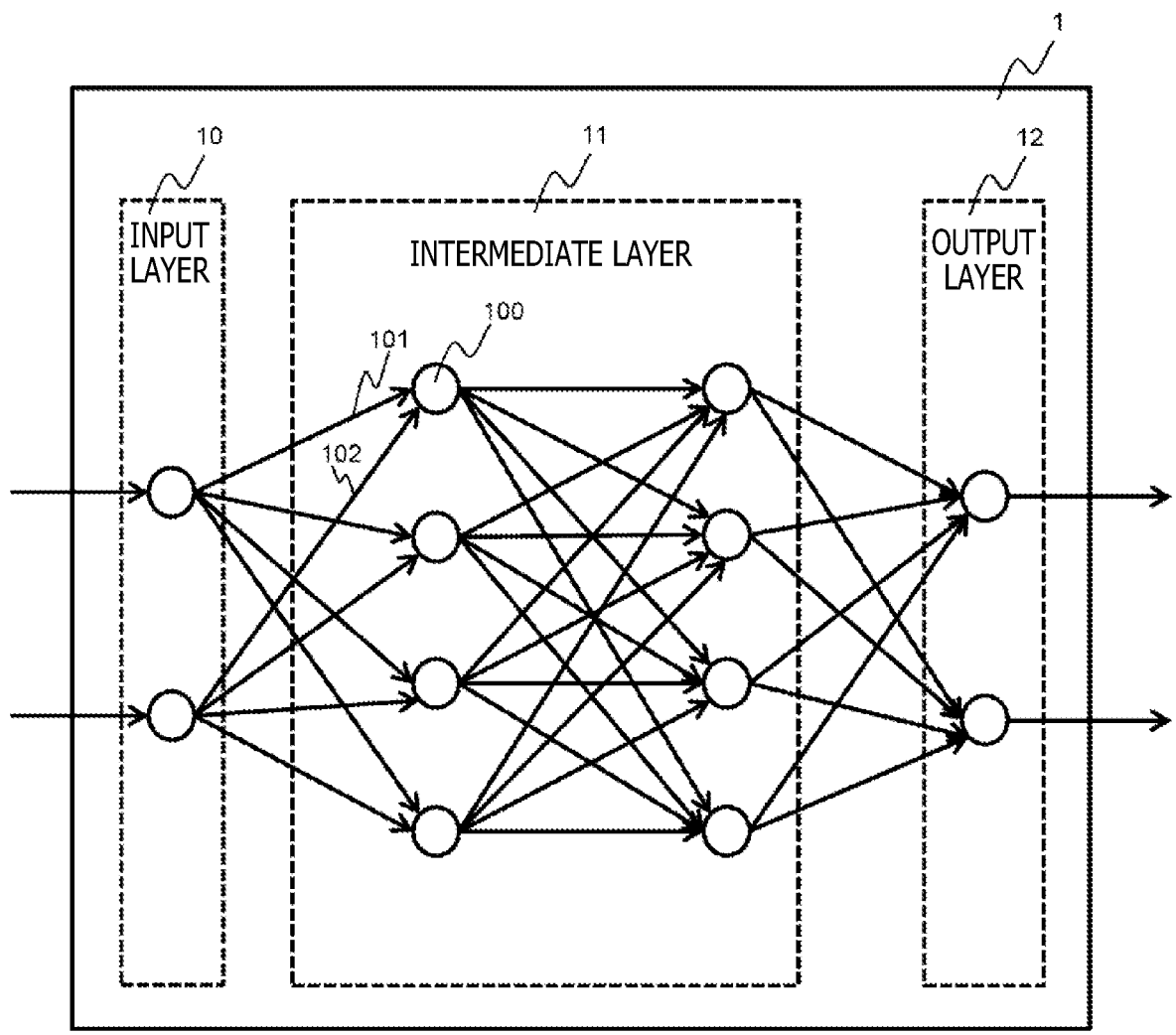
FIG. 1 is a diagram illustrating one example of the structure of an AI model.

FIG. 1 is a diagram illustrating one example of the structure of an AI model. As illustrated in FIG. 1, a neural network model 1 includes an input layer 10, an intermediate layer 11, and an output layer 12 and the respective layers have I, J, and K, respectively, arithmetic units 100. The respective arithmetic units 100 are coupled based on the connection information between the arithmetic units 100 as shown by numeral 101 and numeral 102 in FIG. 1. When information is input to the input layer 10, the connection information is added and the information is propagated in the intermediate layer 11, and finally information equivalent to a prediction result is output from the output layer 12. The connection information relating to coupling between the arithmetic units 100 is referred to as "network structure information" in the present embodiment. The arithmetic unit 100 is equivalent to the above-described "neuron" and "arithmetic unit" of neural network indicates neurons in DNN.

The connection information is composed of a connection coefficient and a bias and information is propagated from the input layer 10 to the output layer 12 while arithmetic operation with use of the connection coefficient as a coefficient is carried out. The connection coefficient used in arithmetic operation of the AI model is referred to as "DNN weight" in the present embodiment. Furthermore, in the present embodiment, description will be made on the premise that the bias is excluded and the connection information is composed only of the DNN weight for simplification of explanation. That is, in the present embodiment, the connection information and the DNN weight as a DNN model parameter are identical. However, the configuration in which the bias is included in the connection information is also included in the present invention.

Furthermore, in the present embodiment, an ID is given to each DNN weight for convenience in order to classify individual DNN weights. Moreover, the value of the DNN weight is referred to as "DNN weight value" or "value of the DNN weight." That is, in the following, expression like "the DNN weight value of the DNN weight whose ID is 11 is xx" is made. The contents of arithmetic operation are identified based on the kind of layer included in the connection information. The layers included in the connection information are convolutional layer, batch normalization, activation function, pooling layer, fully-connected layer, LSTM (Long Short Term Memory) layer, and so forth.

The number of arithmetic units 100 and the number of layers that configure the intermediate layer 11 are irrelevant to the embodiments and therefore are set to optional values. Furthermore, the structure of the AI model is also not particularly limited and may be what has reflexivity or bidirectionality in the connection between the arithmetic units 100, for example. Moreover, the present embodiment can be applied to any AI model such as both supervised and unsupervised machine learning models and a reinforcement learning model. This is because the AI model can be compressed through pruning of the DNN weight or the arithmetic unit of the AI model without affecting the accuracy of inference on high-priority data for which inference with high accuracy is required. However, changing the DNN weight value of the DNN weight to zero is also included in the pruning of the DNN weight.

Figure 2:
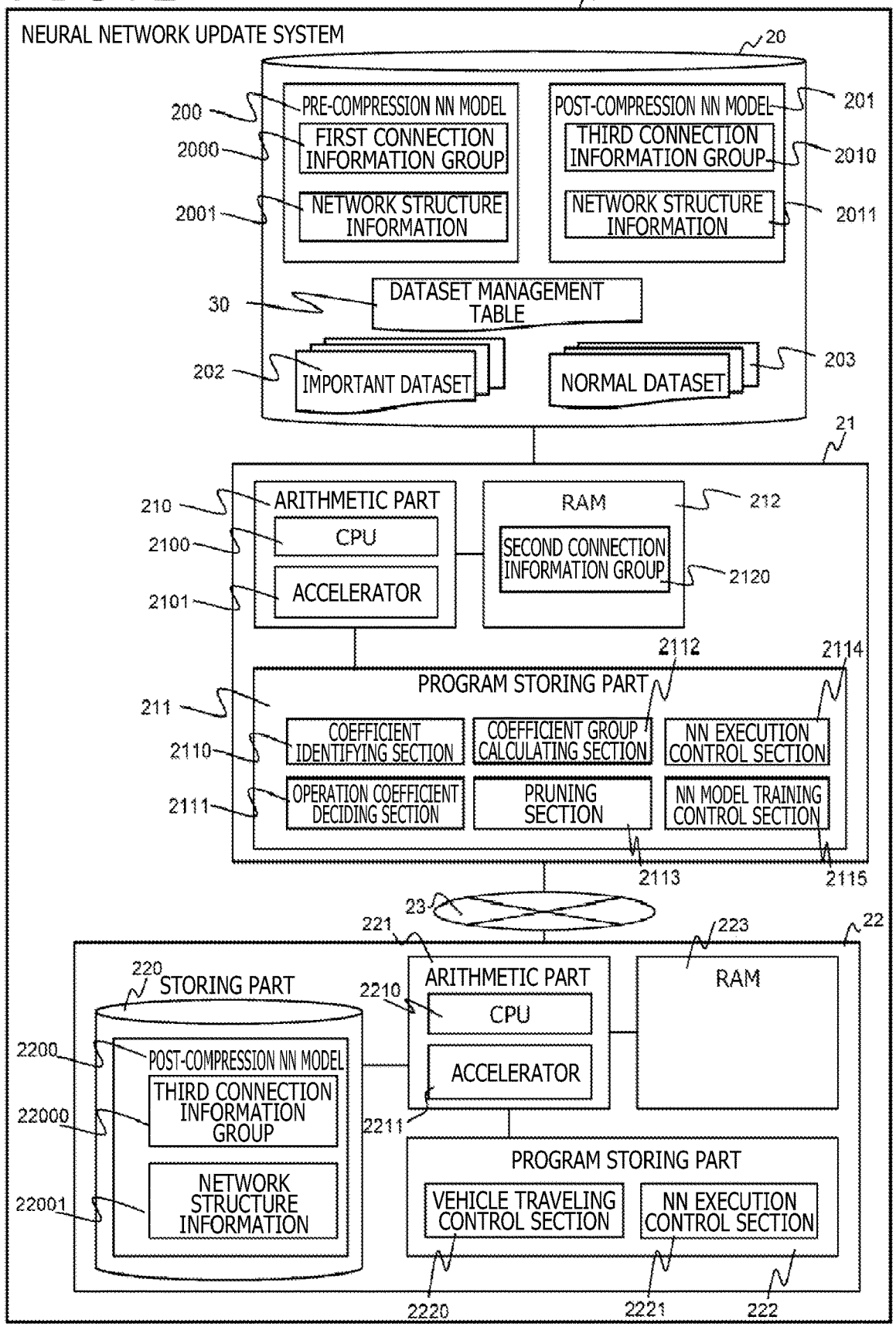
FIG. 2 is a configuration diagram of a neural network update system 2 in a first embodiment.

FIG. 2 is a configuration diagram of a neural network update system 2 in the first embodiment. The neural network update system 2 is composed of a storing part 20, a server 21, and an electronic control device 22. As illustrated in FIG. 2, the server 21 and the electronic control device 22 are coupled through a network 23. Although the storing part 20 is directly coupled to the server 21 in FIG. 2, the storing part 20 may be coupled to the server 21 through the network 23.

In the present embodiment, compression of a neural network is carried out in the server 21 and the electronic control device 22 downloads the compressed neural network from the server and updates the neural network. Thereby, arithmetic processing using the neural network is executed in an application of autonomous driving or the like. However, the present embodiment is not limited to such a configuration. Specifically, in the case of an architecture in which additional learning and updating of a neural network are carried out within a vehicle including the electronic control device 22 without the intermediary of the server 21, or the like, a configuration in which the electronic control device 22 is equipped with all or part of the above-described functions may be employed.

The storing part 20 is a non-volatile storage area, for example, a flash memory. In the storing part 20, neural network information and dataset used by the server 21 in learning, generation, and compression processing of the neural network are stored. Specifically, a pre-compression neural network model 200, a post-compression neural network model 201, an important dataset 202, and a normal dataset 203 are included in the storing part 20.

The pre-compression neural network model 200 refers to information on the neural network before application of compression and is composed of a first connection information group 2000 and network structure information 2001. The first connection information group 2000 is the DNN weight values of the DNN weights of the neural network before application of compression. The network structure information 2001 is network structure information of the neural network before application of compression. The pre-compression NN model 200 is the whole of the neural network model 1 illustrated in FIG. 1, for example. The first connection information group 2000 is the DNN weight values of all DNN weights extracted from the NN model 1 illustrated in FIG. 1, for example. Furthermore, the network structure information 2001 is information obtained by excluding the DNN weight values of all DNN weights from the NN model 1, for example.

The post-compression neural network model 201 is information on the neural network after application of compression and is composed of a third connection information group 2010 and network structure information 2011. The third connection information group 2010 refers to the DNN weight values of the DNN weights of the neural network after application of compression. The network structure information 2011 refers to network structure information of the neural network after application of compression. When there is no difference in the network structure information of the neural network between before and after application of compression, the network structure information 2001 and the network structure information 2011 are identical.

The important dataset 202 and the normal dataset 203 are data groups created in advance and are used for construction of the neural network and a test of inference. Each data included in the important dataset 202 and the normal dataset 203 is, for example, a combination of sensor outputs collected by a vehicle in traveling, the relative distance from a vehicle that travels on the front side, and information on whether or not the vehicle that travels on the front side is traveling on the same lane.

The important dataset 202 is a dataset for which inference with high accuracy is required and is, for example, a data group that directly relates to vehicle traveling control and about which an error in inference is desired to be reduced as much as possible. The important dataset 202 is a dataset in the case in which the relative distance is short and a vehicle is traveling on the same lane, for example. The normal dataset 203 is a data group that is other than the important dataset 202 and does not directly relate to vehicle traveling control. The normal dataset 203 is, for example, a dataset in which the relative distance is very long and a dataset in the case in which a vehicle is traveling on a different lane. Which of the important dataset 202 and the normal dataset 203 certain data is to be classified into may be decided by the server 21 through arithmetic processing with reference to a dataset management table 30 to be described next or may be decided by an operator of the server 21 according to a rule defined in advance.

FIG. 3 is a diagram illustrating one example of the dataset management table 30. The dataset management table 30 is composed of plural records and each record is composed of a data type name 300, a priority determination condition 301, a priority 302, and an operation coefficient 303. The data type name 300 is a name set for convenience for classifying data. Therefore, the data type name 300 may be any character string as long as classification is possible. The priority determination condition 301 is a condition for determining the priority. In other words, it is a condition showing the applicability to the relevant record.

The priority 302 shows that, when the numerical value is larger, the priority is higher, that is, inference with higher accuracy is required. Each data may be classified into the important dataset 202 or the normal dataset 203 on the basis of the value of this priority. The operation coefficient 303 is information used at the time of compression and is used to determine the DNN weight as the target of pruning, i.e., the ID of the DNN weight as the target of pruning, for example.

The priority determination condition 301 is composed of a relative distance 3010 and a leading vehicle flag 3011. The relative distance 3010 is information that represents the relative distance between the self-vehicle and an object. There is a tendency that, when the value of the relative distance is smaller, it is determined that the value of the priority 302 is larger, that is, the priority of this data is higher. The leading vehicle flag 3011 is flag information that represents whether or not the object of the target corresponds to a leading vehicle on the same traveling lane from the viewpoint of the self-vehicle.

If the leading vehicle flag 3011 is TRUE, the value of the priority tends to be large. In the example shown on the first row in FIG. 3, in the case in which the leading vehicle flag 3011 is ON and the relative distance 3010 is within 30 meters, the data are determined as data 1 for objection detection, and the priority 302 is set to 3 and the operation coefficient is set to 2. Furthermore, in the example shown on the last row in FIG. 3, in the case in which the leading vehicle flag 3011 is FALSE, the data are all determined as data 4 for object detection when the relative distance 3010 is within 500 meters, and the priority 302 is set to 1 and the operation coefficient is set to 1.

Referring back to FIG. 2, the server 21 includes an arithmetic part 210, a program storing part 211, and a RAM 212. The arithmetic part 210 includes at least a CPU (Central Processing Unit) 2100 that is a central arithmetic device as hardware and the CPU 2100 executes learning, generation, and compression processing of the neural network according to programs stored in the program storing part 211. However, functions similar to programs stored in the program storing part 211 may be implemented as a hardware circuit. Moreover, when functions of all programs stored in the program storing part 211 are implemented as a hardware circuit, the server 21 does not have to include the program storing part 211.

In order to enhance the speed of learning, generation, and compression of the neural network, an accelerator 2101 may be included in the arithmetic part 210. As the accelerator 2101, hardware devices such as FPGA, ASIC, and GPU are conceivable.

The program storing part 211 includes a non-volatile semiconductor memory such as a flash memory. In the program storing part 211, programs for implementing an arithmetic coefficient identifying section 2110, an operation coefficient deciding section 2111, a coefficient group calculating section 2112, a pruning section 2113, an NN execution control section 2114, and an NN model training control section 2115 are stored. The "NN execution control section" means "to execute NN inference." These programs are executed by the arithmetic part 210. Operation of these programs will be described later with reference to FIG. 4 and FIG. 5. Furthermore, the configuration of the programs is optional and connection and separation of programs may be carried out in any manner. For example, one program may combine all of functions equivalent to the arithmetic coefficient identifying section 2110, the operation coefficient deciding section 2111, the coefficient group calculating section 2112, the pruning section 2113, the NN execution control section 2114, and the NN model training control section 2115.

The RAM 212 is a volatile semiconductor memory. In the RAM 212, data for execution of a program by the arithmetic part 210, for example, a second connection information group 2120, is stored. The second connection information group 2120 is used as a determination condition when the neural network is compressed. The second connection information group 2120 is referred to also as "important relevant WHI." Details will be described later.

The network 23 represents a communication network for access to the server 21 by the vehicle including the electronic control device 22. As access means, systems of cellular, wireless LAN, and so forth are conceivable, for example. Besides these wireless means, a connection may be made by wired means through OBD (On-Board Diagnostics) or OBD2 (On-Board Diagnostics2).

The electronic control device 22 includes a storing part 220, an arithmetic part 221, a program storing part 222, and a RAM 223. The storing part 220 is a non-volatile storing device such as a flash memory. A post-compression neural network model 2200 is stored in the storing part 220. The post-compression NN model 2200 is composed of a third connection information group 22000 and network structure information 22001. The post-compression NN model 2200 stored in the electronic control device 22 has the same name as the post-compression NN model 201 stored in the storing part 20. However, the data itself is not necessarily identical. However, in the initial state immediately after shipping, the post-compression NN model 2200 and the post-compression NN model 201 are identical.

The arithmetic part 221 includes a CPU 2210 that is a central arithmetic processing device. The CPU 2210 executes inference processing using the neural network and learning processing of the neural network according to programs stored in the program storing part 222. The arithmetic part 221 may include an accelerator 2101 in order to enhance the speed of these inference processing and learning processing. As the accelerator 2101, hardware devices such as FPGA, ASIC, and GPU are conceivable. The program storing part 222 includes a non-volatile semiconductor memory such as a flash memory. In the program storing part 222, programs for implementing a vehicle traveling control section 2220 and an NN execution control section 2221 are stored.

The vehicle traveling control section 2220 has functions necessary to control traveling of the vehicle, such as perception, cognition, and determination. The vehicle traveling control section 2220 does not have to solely carry out perception, cognition, and determination for controlling traveling of the vehicle, and may carry out sharing and cooperation with another piece of equipment mounted in the vehicle or another piece of equipment coupled through the network 23, for example.

The NN execution control section 2221 executes inference processing by using the post-compression NN model 2200 stored in the storing part 220. Although diagrammatic representation is not made, the electronic control device 22 may further have a learning function of the post-compression neural network model 2200 instead of only the inference processing. Due to the possession of the learning function by the electronic control device 22, it becomes possible for the electronic control device 22 to solely execute additional learning and updating of the neural network without cooperating with the server 21.

(Operation)

Figure 4:
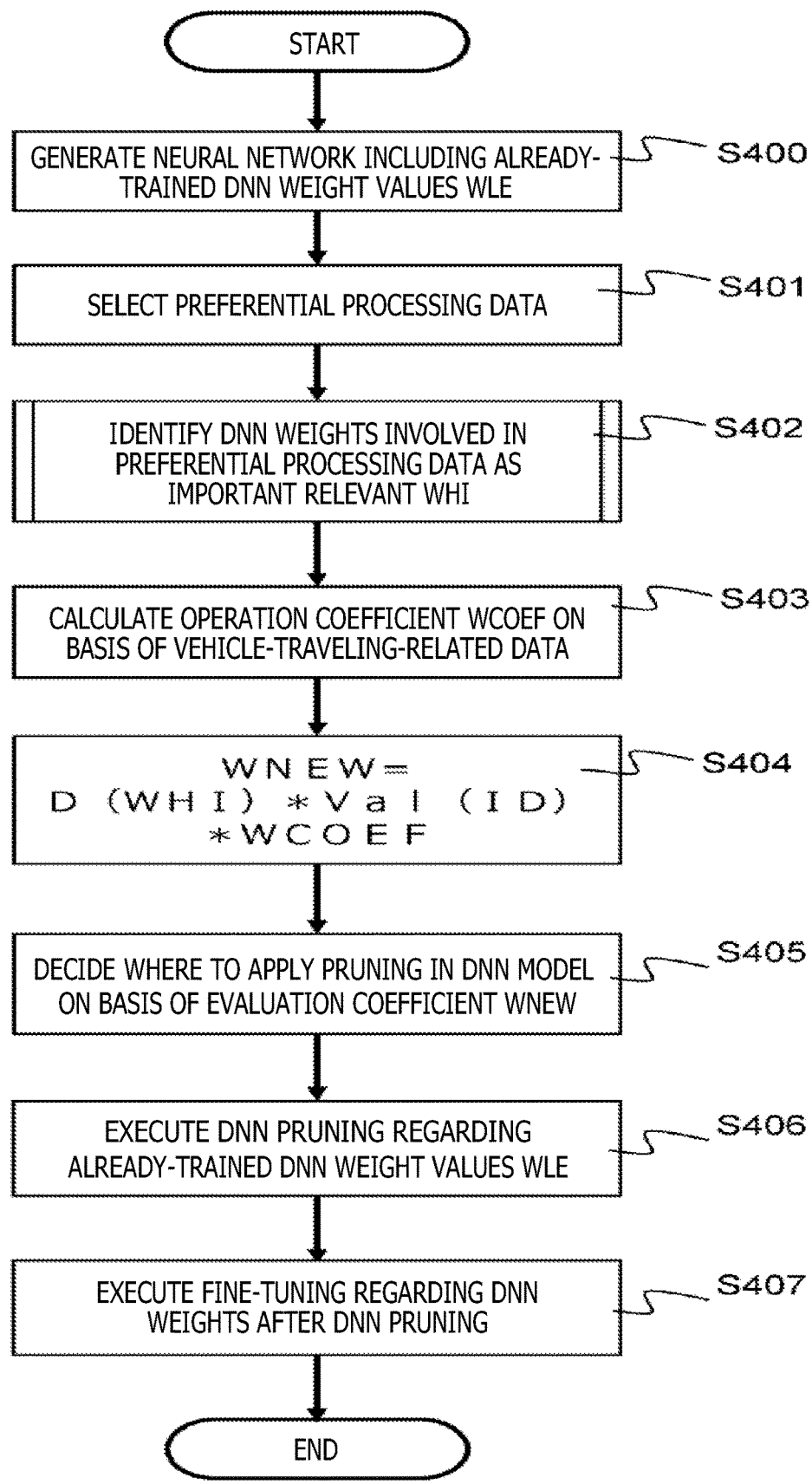
FIG. 4 is a flowchart illustrating compression processing of a neural network by a server 21.

Compression of a neural network by the server 21 will be described with reference to FIG. 4 and FIG. 5. FIG. 4 is a flowchart illustrating compression processing of a neural network by the server 21. First, in a step S400, the NN model training control section 2115 generates a neural network including already-trained DNN weight values WLE, i.e., a pre-compression neural network model.

Then, in a step S401, the important dataset 202 is selected from data stored in the storing part 20 with reference to the dataset management table 30. In this case, for example, data about which the priority is equal to or higher than 3 is classified into the important dataset 202 and data about which the priority is equal to or lower than 2 is classified into the normal dataset 203. Selection of data in this classification may be carried out by an operator of the server 21 or the server 21 may carry out the selection through arithmetic operation. Furthermore, if the data have been already classified, the processing of S401 may be omitted.

Subsequently, in a step S402, the arithmetic coefficient identifying section 2110 identifies the DNN weights involved in the important dataset 202 in the already-trained DNN weight values WLE and records a collection of IDs thereof as the important relevant WHI. That is, the important relevant WHI is what is obtained by listing the ID numbers of the DNN weights involved in the important dataset 202. Details of S402 will be described with the next FIG. 5.

In a subsequent step S403, the operation coefficient deciding section 2111 calculates an operation coefficient WCOEF on the basis of the dataset management table 30 and the important dataset 202. The operation coefficient WCOEF exists corresponding to each DNN weight and the initial values of all operation coefficients WCOEF are identical, for example, zero. To the operation coefficient WCOEF corresponding to the DNN weight identified by using the important dataset 202 classified into data for object detection at the uppermost stage in the example illustrated in FIG. 3, "2" as the value of the operation coefficient 303 of the data is added. The operation coefficient WCOEF corresponding to the DNN weights identified based on a larger amount of important dataset 202 has a larger value.

In a step S404, the coefficient group calculating section 2112 calculates an evaluation coefficient WNEW used for determination of a place to which pruning in DNN model of the DNN weight is applied in the neural network by using the important relevant WHI and the operation coefficient WCOEF. The evaluation coefficient WNEW also exists regarding each DNN weight. The evaluation coefficient WNEW is calculated as shown by the following expression 1, for example, regarding each DNN weight, in other words, regarding the ID of each DNN weight.

$$WNEW=D(WH1)*Val(ID)*WCOEF \qquad \text{(Expression 1)}$$

D(WH1) is a function that returns "1" when the ID of the DNN weight of the processing target is included in the important relevant WHI and returns zero when the ID of the DNN weight of the processing target is not included in the important relevant WHI. Furthermore, Val(ID) is a function that returns the DNN weight value of the DNN weight that is the ID of the processing target. Although details will be described later, the evaluation coefficient WNEW is a value to which reference is made in determination processing of pruning and pruning is carried out less readily when the value thereof is larger.

In a subsequent step S405, the pruning section 2113 decides the DNN weights that become the target of pruning on the basis of the value of the evaluation coefficient WNEW. Then, in a step S406, the DNN weight values of the DNN weights of the pruning target are set to zero from the already-trained DNN weight values WLE to generate a new neural network. However, if all of the row elements or column elements of the DNN weight become zero, the row or column may be deleted.

Moreover, the DNN weights may be deleted in units of set of all DNN weights coupled to each arithmetic unit 100 (neuron). For this, a method is conceivable in which the sums of squares of the respective DNN weights coupled to the arithmetic units 100 are each calculated and sets of the DNN weights are deleted sequentially from the set with the smallest value of the sum of squares. The generated neural network is stored in the storing part 20 as the post-compression NN model 201 and is transmitted to the electronic control device 22 to be saved in the storing part 220. The number of places to which pruning in DNN model is applied is set to one or more.

Thereafter, in a step S407, the DNN weights in the new neural network newly generated in the step S406 are optimized by relearning, i.e., fine tuning. This fine tuning makes it possible to intend improvement in the accuracy of inference. However, the step S407 is not essential and the processing illustrated in FIG. 4 may be ended upon the completion of the execution of S406.

Figure 5:
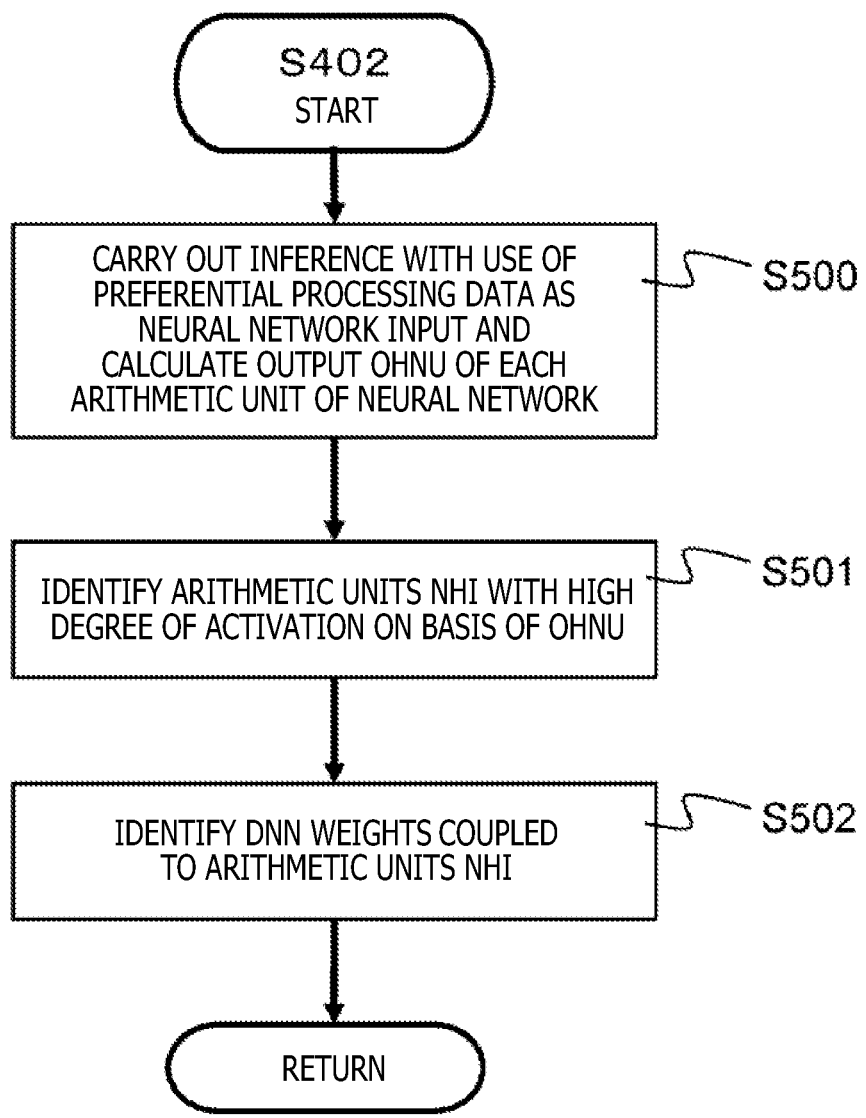
FIG. 5 is a flowchart illustrating details of S402 in FIG. 4.

FIG. 5 is a flowchart illustrating details of S402 in FIG. 4. The execution entity of processing illustrated in FIG. 5 is the coefficient identifying section 2110. First, in S500, the coefficient identifying section 2110 causes the NN execution control section 2114 to input the important dataset 202 to the neural network generated in the step S400 and carry out inference to calculate an output OHNU of each arithmetic unit of the neural network. In a subsequent step S501, the coefficient identifying section 2110 identifies arithmetic units NH1 with a high degree of activation on the basis of the output OHNU. It is determined that the arithmetic units identified by this processing are arithmetic units greatly involved in the important dataset 202.

Here, a method is conceivable in which whether or not the degree of activation is high is determined based on whether or not the output OHNU is equal to or higher than a threshold ACTTH. As another method, a method is conceivable in which a certain percentage from the upper level is determined as the arithmetic units with a high degree of activation sequentially from that with the largest value in all outputs OHNU of each layer of the neural network.

Thereafter, in a step S502, regarding the arithmetic units NH1 identified in the step S501, the coefficient identifying section 2110 identifies the DNN weights coupled to the arithmetic units NH1 and employs the identified DNN weights as the important relevant WHI to thereby end this processing flow. As one example of the processing of the step S502, determination is made as follows when the arithmetic unit NH1 is the arithmetic unit 100 illustrated in FIG. 1. Specifically, the DNN weights coupled to the arithmetic unit 100 are the connection information 101 and the connection information 102. As above, the DNN weights coupled to each arithmetic unit are uniquely identified from the network structure information of the neural network.

According to the above-described first embodiment, the following operation and effects are obtained.

(1) The neural network update system 2 includes the server 21 and the electronic control device 22. The neural network update system 2 updates a neural network including the plural neurons 100 and a connection information group including plural pieces of connection information that associate the neurons with each other and are shown by numeral 101 and numeral 102 in FIG. 1. The server 21 includes the storing part 20 and the arithmetic part 210. The storing part 20 stores the first connection information group 2000 for deciding an output value when an input value is given. The arithmetic part 210 includes the coefficient identifying section 2110 that identifies the second connection information group 2120 that is plural pieces of connection information having the degree of influence on predetermined data, the degree of influence exceeding a predetermined value, when the predetermined data is given as the input value and the pruning section 2113 that deletes at least one piece of connection information from the first connection information group 2000 to create the third connection information group 2010 on the basis of the first connection information group 2000 and the second connection information group 2120. The electronic control device 22 stores the post-compression NN model 2200 including the third connection information group 2010.

With the third connection information group 2010, the amount of arithmetic operation, i.e., the power consumption, can be reduced because the connection information is deleted compared with the first connection information group 2000. Moreover, because the connection information to be deleted is decided in consideration of the degree of influence on the important dataset for which inference with high accuracy is required, the lowering of the accuracy of inference on the important dataset can be confined.

(2) The predetermined data is data in which the priority relating to vehicle traveling exceeds a predetermined value. Thus, the lowering of the system of inference on data for which inference with high accuracy is required regarding traveling of a vehicle can be confined.

(3) The pruning section 2113 decides an operation coefficient group that is a collection of the operation coefficients corresponding to the respective pieces of connection information included in the second connection information group 2120, and multiplies the corresponding connection information included in the first connection information group 2000 by each operation coefficient to calculate the evaluation coefficient and make an evaluation coefficient group. Furthermore, the pruning section 2113 identifies the corresponding connection information from the first connection information group 2000 regarding the evaluation coefficient that exceeds a predetermined value in the evaluation coefficient group, and deletes the connection information other than this identified connection information from the first connection information group 2000 to create the third connection information group 2010. As above, the connection information having the degree of influence on the important dataset for which inference with high accuracy is required, the degree of influence exceeding the predetermined value, is not deleted. Therefore, the lowering of the accuracy of inference on the important dataset can be confined.

(4) The coefficient identifying section 2110 identifies, in the plural neurons 100, the neuron 100 involved in decision of the output value if the output value when the predetermined data is given exceeds a predetermined value, and identifies the connection information associated with this identified neuron 100 as the connection information that configures the second connection information group 2120.

Modification Example 1

In the data stored in the storing part 20, i.e., the important dataset 202 and the normal dataset 203, the relative distance from a vehicle that travels on the front side does not have to be included. It suffices that information with which whether or not inference with high accuracy is required can be determined is included in the data stored in the storing part 20. For example, in the case in which the type and the height of objects are included in the data stored in storing part 20, the dataset management table 30 is changed to a dataset management table 31 illustrated in FIG. 6.

In the dataset management table 31 illustrated in FIG. 6, the contents of the priority determination condition 301 are different compared with the dataset management table 30 in the first embodiment, and the priority determination condition 301 is composed of an object class for classification 3012 and an object height 3013. The object class for classification 3012 shows the type of an object. In the example illustrated in FIG. 3, the priority is set high when the object is any of vehicle, pedestrian, and bicycle. The object height 3013 shows the height of the object and the priority is set higher when the object height 3013 is higher.

In the case in which various kinds of information are included in the data stored in the storing part 20, the priority determination condition 301 may be changed according to an application that uses this data. That is, it suffices that the priority 302 and the operation coefficient 303 can be decided regarding each data, and the priority determination condition 301 may use another kind of information. For example, the priority determination condition 301 may be conditions relating to another kind of autonomous driving logic in which an AI is used, such as self-position estimation, sensor fusion, map fusion, free space detection, movement prediction of objects, and traveling path planning.

Modification Example 2

The pre-compression NN model 220 may be further stored in the storing part 220 of the electronic control device 22 and arithmetic processing using a neural network may be executed with switching to the pre-compression NN model 220 if some sort of problem occurs in the post-compression NN model 2200. Some sort of problem is, for example, the occurrence of the situation in which sudden braking has to be done for collision avoidance due to use of the output result of the post-compression NN model 2200. By carrying out switching to the pre-compression NN model 220 when such a problem occurs, the influence on vehicle traveling due to execution of compression processing can be eliminated.

Modification Example 3

The decision method of the evaluation coefficient WNEW is not limited to the method of using expression 1 shown in the first embodiment. It suffices that the value of the evaluation coefficient WNEW is allowed to become larger so that the DNN weight involved in the important dataset 202 may be pruned less readily. For example, the evaluation coefficient WNEW may be calculated through carrying out bit-shift operation on the DNN weight value of the DNN weight that is the ID of the processing target by using a correction value such as the operation coefficient WCOEF. Furthermore, the evaluation coefficient WNEW may be calculated through adding a correction value such as the operation coefficient WCOEF to the DNN weight value of the DNN weight that is the ID of the processing target.

Modification Example 4

Figure 7:
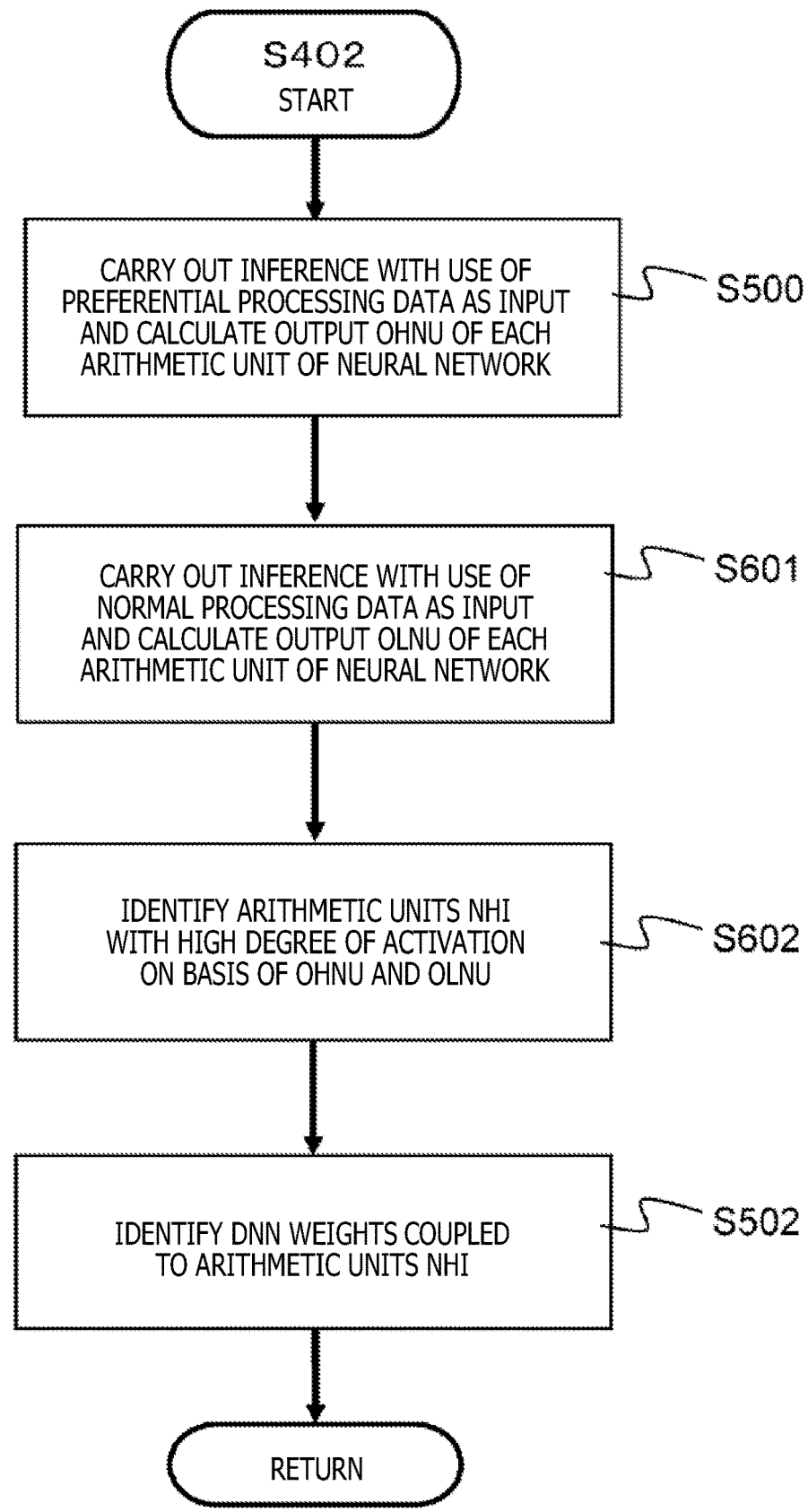
FIG. 7 is a diagram illustrating details of a step S402 illustrated in FIG. 3 in modification example 4.

FIG. 7 is a diagram illustrating details of the step S402 illustrated in FIG. 3 in modification example 4. That is, in the present modification example, processing illustrated in FIG. 6 is executed instead of the processing illustrated in FIG. 5. However, the same processing as the first embodiment is given the same step number and description is omitted. In FIG. 7, the step S500 is carried out first, and the output OHNU is calculated similarly to the first embodiment.

In a subsequent step S601, the NN model training control section 2115 carries out inference with use of the normal dataset 203 as input to the neural network and calculates an output OLNU of each arithmetic unit of the neural network. Then, in a step S602, the arithmetic coefficient identifying section 2110 identifies the arithmetic units NH1 with a high degree of activation on the basis of OHNU and OLNU, for example, on the basis of the difference between OHNU and OLNU. In the subsequent S502, the important relevant WHI is identified similarly to the first embodiment and the processing illustrated in FIG. 7 is ended.

Figure 8A:
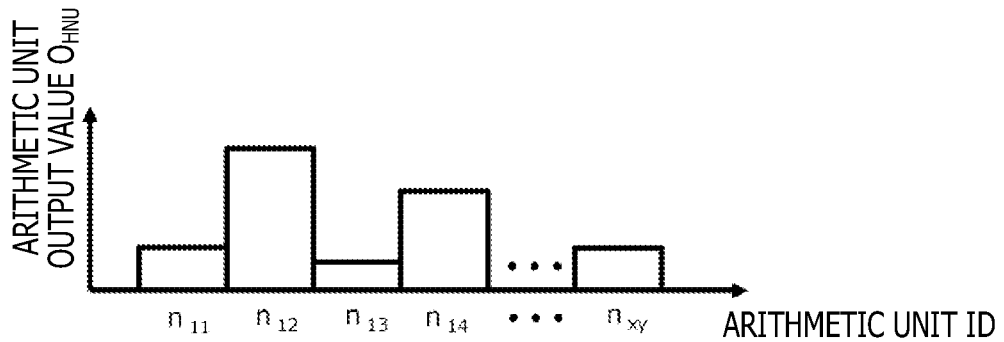
FIGS. 8A to 8C are a diagram illustrating one example of processing of a step S602 in modification example 4.
Figure 8B:
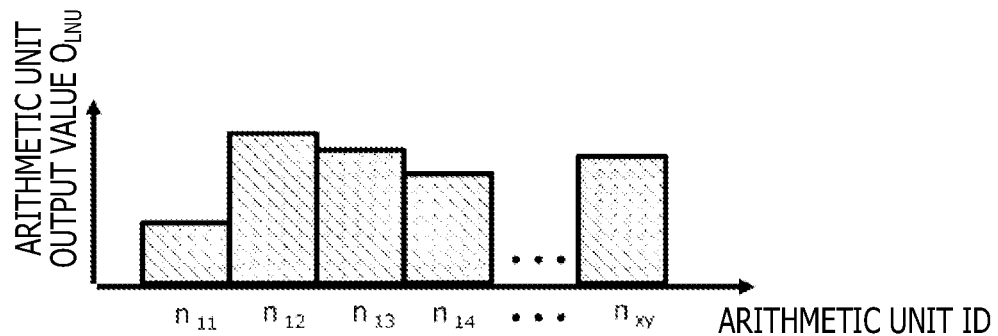
Figure 8C:
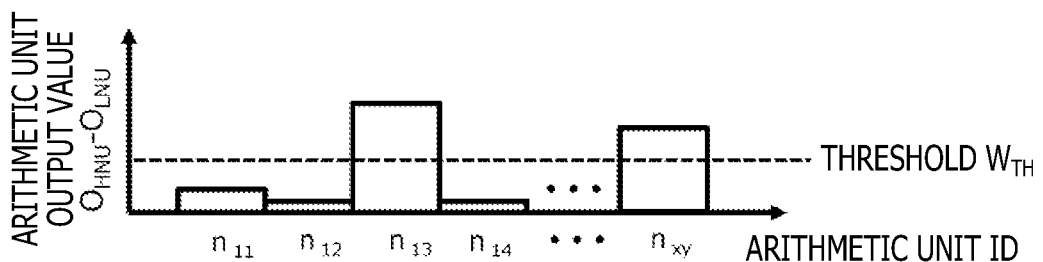

FIG. 8 is a diagram illustrating one example of the processing of the step S602. FIG. 8A is a diagram illustrating OHNU of each arithmetic unit in the step S600. FIG. 8B is a diagram illustrating OLNU of each arithmetic unit in the step S601. FIG. 8C is a diagram illustrating the difference between OHNU and OLNU regarding each arithmetic unit. In FIGS. 8A to C, the outputs of different arithmetic units line up in the abscissa axis direction, and the same arithmetic unit is shown when the position in the left-right direction in FIGS. 8A to C is the same.

In FIG. 8, an ID is allocated to each arithmetic unit. For example, the arithmetic unit whose ID is "n11" is shown at the left end in FIG. 8A to FIG. 8C and the difference between FIG. 8A and FIG. 8B is FIG. 8C. Furthermore, in FIG. 8C, a threshold WTH is set and the arithmetic units larger than the threshold WTH are identified as the arithmetic units NH1 with a high degree of activation.

Modification Example 5

Figure 9:
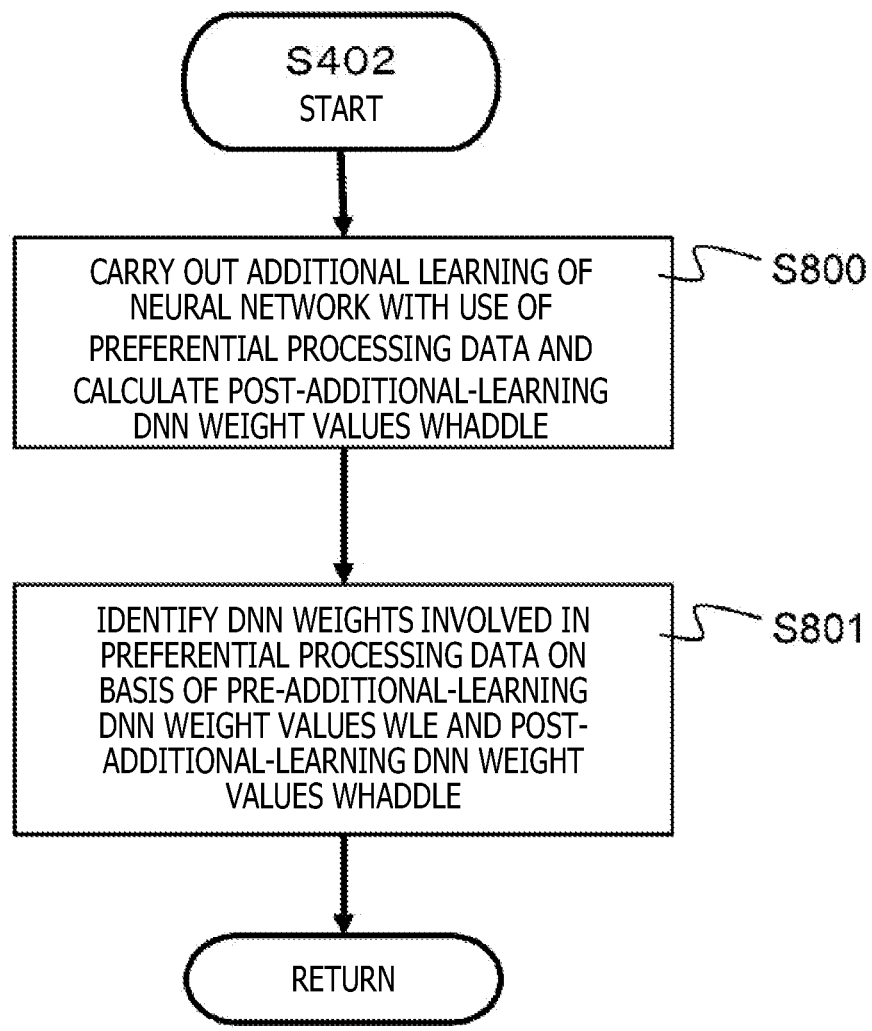
FIG. 9 is a diagram illustrating details of the step S402 illustrated in FIG. 3 in modification example 5.

FIG. 9 is a diagram illustrating details of the step S402 illustrated in FIG. 3 in modification example 5. That is, in the present modification example, processing illustrated in FIG. 9 is executed instead of the processing illustrated in FIG. 5. However, the same processing as the first embodiment is given the same step number and description is omitted. In the present modification example, the DNN weights are identified without identifying the arithmetic units that greatly relate to the important dataset 202.

In FIG. 9, first, in a step S800, the NN model training control section 2115 carries out additional learning of the neural network with use of the important dataset 202 and calculates post-additional-learning DNN weights WHADDLE. Data used in the additional learning in the step S800 is different from the data used when the pre-compression NN model 200 is generated.

In a subsequent step S801, based on pre-additional-learning DNN weight values WLE and the post-additional-learning DNN weight values WHADDLE, the coefficient identifying section 2110 carries out arithmetic operation of the difference between both DNN weight values and identifies weight functions involved in the important dataset 202, for example. The pre-additional-learning DNN weight values WLE are the DNN weight values WLE calculated in S400 in FIG. 4. Then, the processing illustrated in FIG. 9 is ended.

Figure 10A:
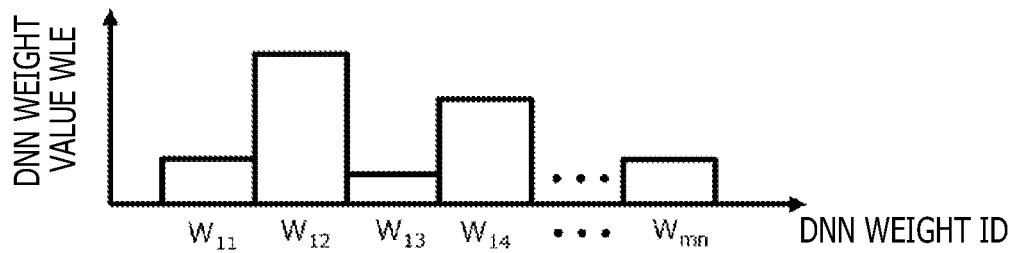
FIGS. 10A to 10C are a diagram illustrating one example of processing illustrated in FIG. 9.
Figure 10B:
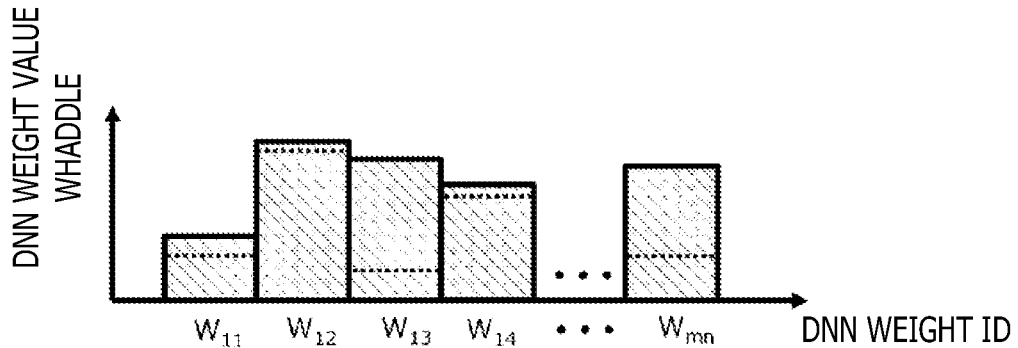
Figure 10C:
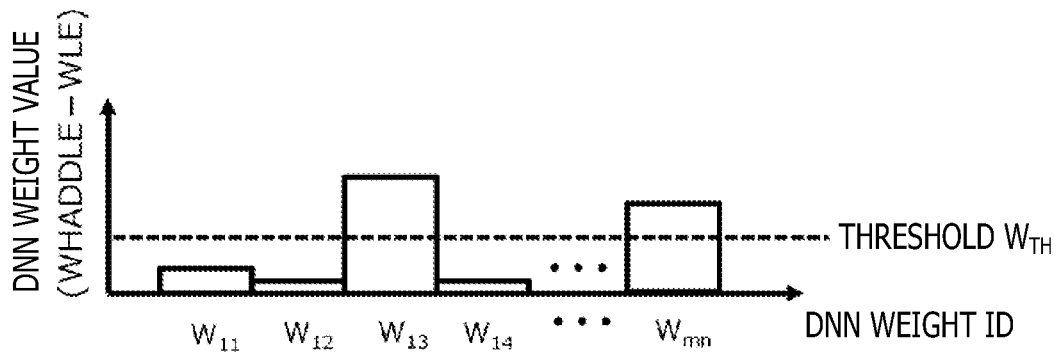

FIG. 10 is a diagram illustrating one example of the processing illustrated in FIG. 9. FIG. 10A is a diagram illustrating the DNN weight value WLE regarding each ID of the DNN weight of the pre-compression NN model 200. FIG. 10B is a diagram illustrating the DNN weight value WHADDLE regarding each ID of the DNN weight in the step S800. FIG. 10C is a diagram illustrating the difference between the DNN weight value WHADDLE and the DNN weight value WLE regarding each DNN weight.

For example, it can be determined that the DNN weight regarding which the difference between the DNN weight value WHADDLE and the DNN weight value WLE is larger than a predetermined threshold WTH greatly relates to the important dataset 202. Furthermore, at this time, the absolute value of the difference between the DNN weight value WHADDLE and the DNN weight value WLE may be evaluated. Moreover, a certain percentage from the upper level may be determined as the DNN weights with a high degree of activation sequentially from the DNN weight regarding which the difference between both is the largest.

Modification Example 6

Figure 11:
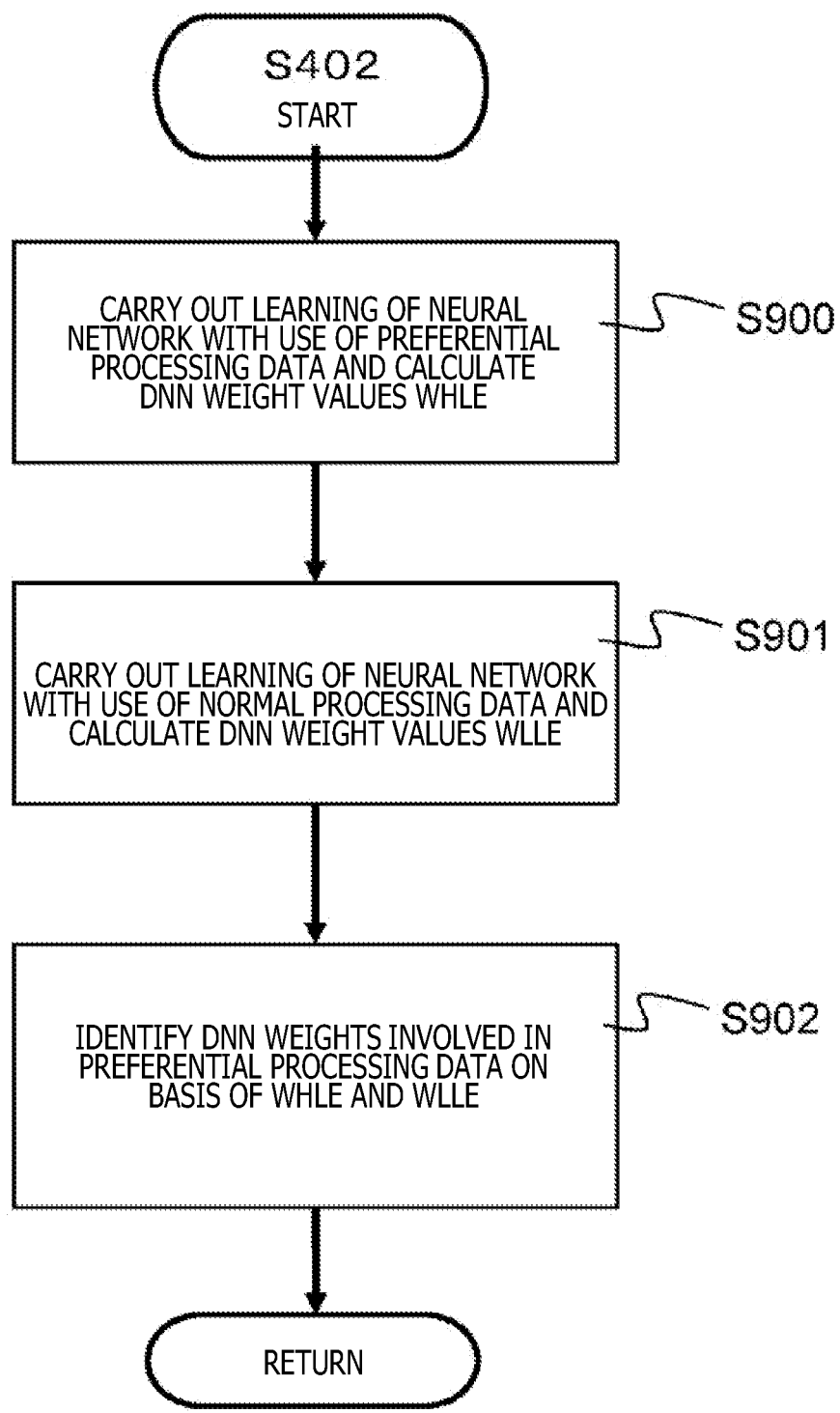
FIG. 11 is a diagram illustrating details of the step S402 illustrated in FIG. 3 in modification example 6.

FIG. 11 is a diagram illustrating details of the step S402 illustrated in FIG. 3 in modification example 6. That is, in the present modification example, processing illustrated in FIG. 11 is executed instead of the processing illustrated in FIG. 5. However, the same processing as the first embodiment is given the same step number and description is omitted. In the present modification example, the DNN weights are identified without identifying the arithmetic units that greatly relate to the important dataset 202 as with modification example 5.

In FIG. 11, first, in a step S900, the NN model training control section 2115 carries out learning of the neural network with use of the important dataset 202 and calculates DNN weight values WHLE. In a subsequent step S901, the NN model training control section 2115 carries out learning of the neural network with use of the normal dataset 203 and calculates DNN weight values WLLE. In a subsequent step S902, the coefficient identifying section 2110 identifies the DNN weights involved in the important dataset 202 on the basis of the already-trained DNN weight values WHLE and the DNN weight values WLLE and names the DNN weights the important relevant WHI.

The step S900 and the step S901 may be carried out in the processing of generating the neural network in the step S400. Furthermore, additional learning of the neural network may be carried out with use of the important dataset 202 and the normal dataset 203 different from those used in the step S400 and thereby the processing of the step S900 and the step S901 may be executed.

Figure 12A:
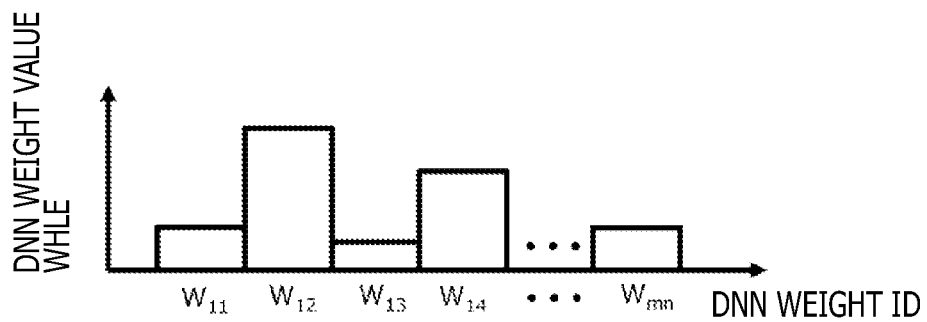
FIGS. 12A to 12C are a diagram illustrating one example of processing of a step S902.
Figure 12B:
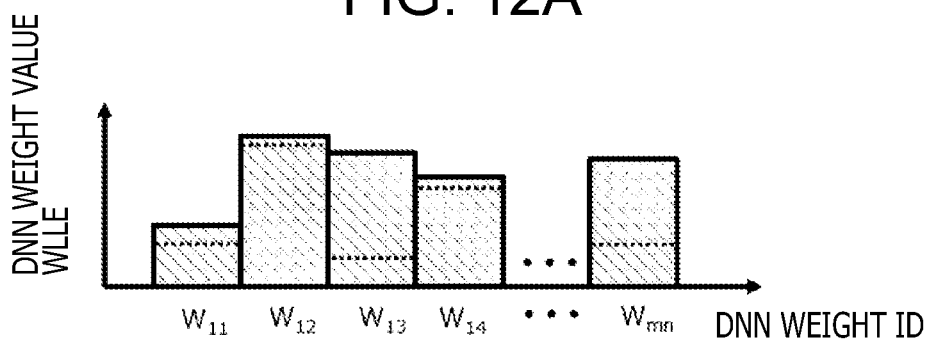
Figure 12C:
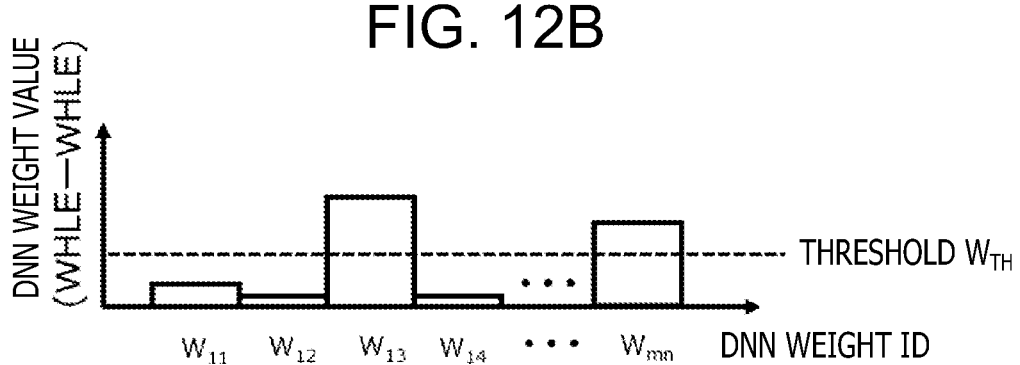

One example of the processing of the step S902 is illustrated in FIG. 12. FIG. 12A illustrates the DNN weight value WHLE regarding each ID of the DNN weight in the step S900. FIG. 12B illustrates the DNN weight value WHADDLE regarding each ID of the DNN weight in the step S901. FIG. 12C is a diagram illustrating the difference between the DNN weight value WHLE illustrated in FIG. 12A and the DNN weight value WHADDLE illustrated in FIG. 12B regarding each ID of the DNN weight.

In FIG. 12C, whether or not each DNN weight greatly relates to the important dataset 202 is determined by carrying out determination of whether or not the difference value of each ID is equal to or larger than a threshold WTH. Here, an absolute value may be taken with respect to the difference result between the DNN weight value WHLE and the DNN weight value WLLE. As another method, a method is conceivable in which a certain percentage from the upper level is determined as the DNN weights with a high degree of activation sequentially from that with the largest difference value.

Modification Example 7

Figure 13:
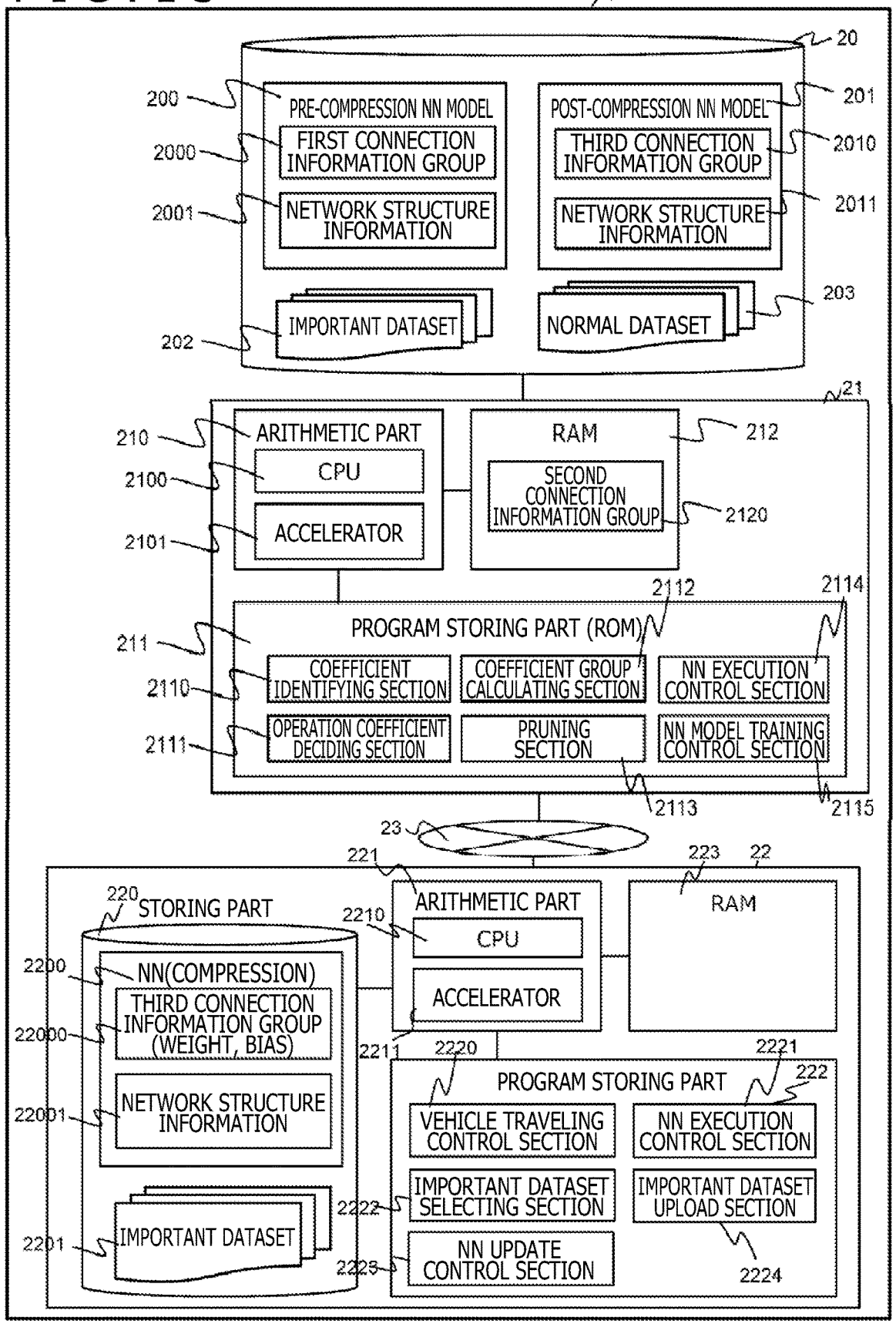
FIG. 13 is a system configuration diagram in modification example 6.

FIG. 13 is a diagram illustrating a system configuration in modification example 7. In the present modification example, a neural network compressed for the electronic control device 22 is updated in cooperation with the server 21 with utilization of traveling data acquired in a vehicle. In the neural network update system 2 in FIG. 13, the configuration of the electronic control device 22 is different as follows compared with the system configuration illustrated in FIG. 2.

In the present modification example, an important dataset 2201 is further saved in the storing part 220. The important dataset 2201 is a dataset extracted by an important dataset selecting section 2222 to be described later in data obtained through sensing of the surroundings of the vehicle by sensors mounted on the vehicle. In the program storing part 222, programs for executing the important dataset selecting section 2222, an NN update control section 2223, and an important dataset upload section 2224 are further stored.

The important dataset selecting section 2222 selects data determined as data that relates to vehicle traveling control and has high priority from data collected by external sensing and so forth in the vehicle. As the selection method, the method described with FIG. 3 is conceivable. Furthermore, as another method, it is conceivable that sensing data relating to the situation in which sudden braking was done for collision avoidance although an accident was not caused is selected as the important dataset. Besides, the following method is conceivable. At the time of manual driving by a driver or when autonomous driving logic or driving assistance logic that does not use a neural network is being carried out, inference processing by a neural network is executed in the background. Furthermore, input data to the neural network is selected as the important dataset if there is a deviation between an output result at the time of the manual driving or an output result of the logic that does not use a neural network and the result of the inference processing by the neural network.

The NN update control section 2223 acquires a neural network newly generated in the server 21 and updates the post-compression NN model 2200 stored in the storing part 220. The important dataset upload section 2224 uploads, to the server 21 through the network 23, the important dataset 2201 that has been selected by the important dataset selecting section 2222 and has been subjected to buffering in the storing part 220.

Modification Example 8

In the above-described first embodiment, the configuration in which the arithmetic coefficients are deleted in compression processing has been explained. However, the neuron, i.e., the arithmetic unit, may be deleted. The case in which the arithmetic unit can be deleted is the case in which the arithmetic coefficients coupled to the arithmetic unit have all become zero or the case in which the arithmetic coefficients coupled to the arithmetic unit have been all deleted.

Second Embodiment

A second embodiment of a neural network update system will be described with reference to FIG. 14 and FIG. 15. In the following description, the same constituent element as the first embodiment is given the same numeral and differences will be mainly explained. The second embodiment is the same as the first embodiment regarding points that are not particularly described. The present embodiment is different from the first embodiment mainly in that the percentage at which DNN weights are pruned is decided. The percentage at which DNN weights are pruned is referred to as "compression rate" in the present embodiment.

Figure 14:
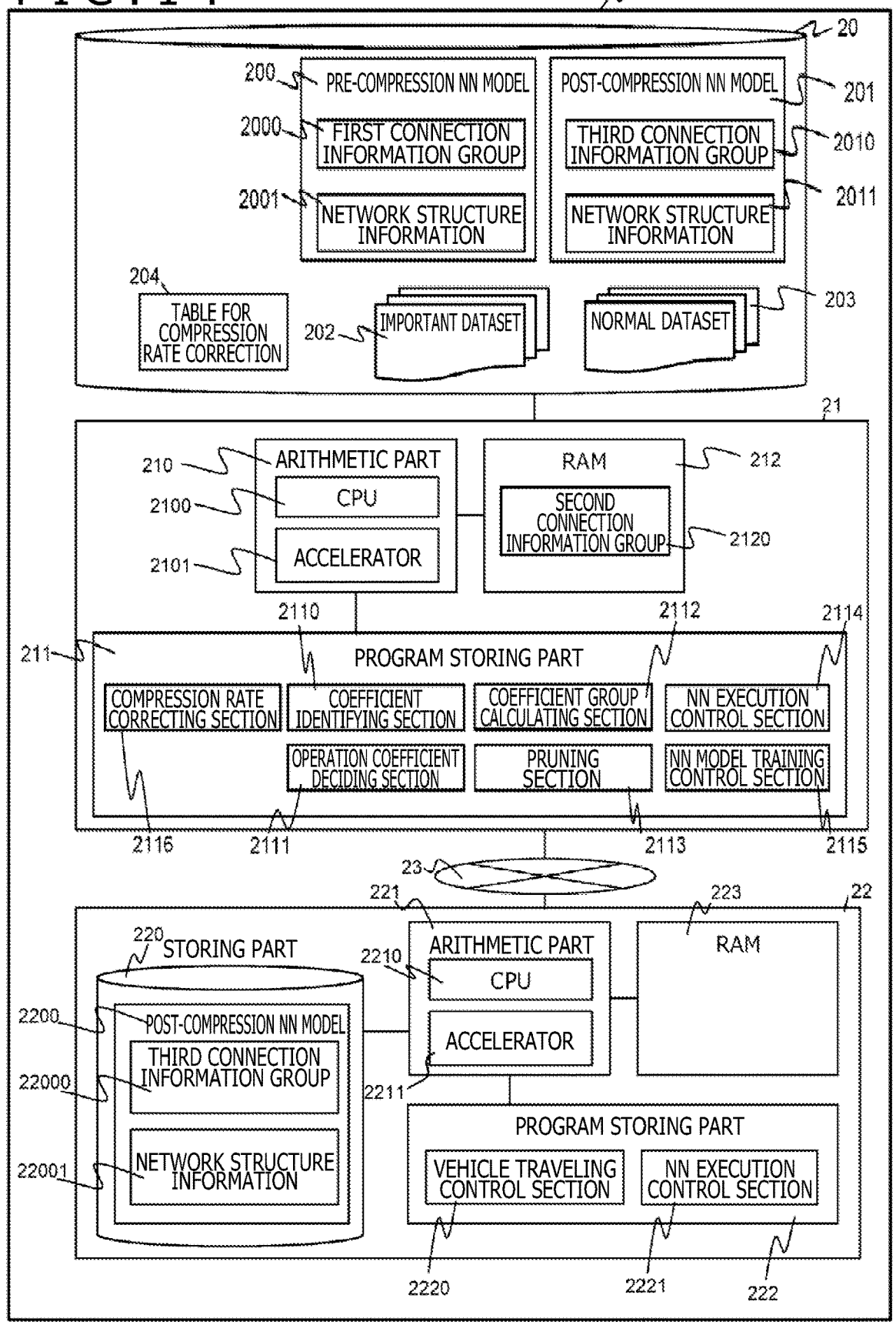
FIG. 14 is a configuration diagram of a neural network update system 2 in a second embodiment.

FIG. 14 is a configuration diagram of a neural network update system 2 in the second embodiment. In the configuration illustrated in FIG. 14, compared with the configuration illustrated in FIG. 2, a program for implementing a compression rate correcting section 2116 is further stored in the program storing part 211 of the server 21 and a compression rate correction table 204 is further stored in the storing part 20. The compression rate correcting section 2116 corrects the compression rate used in the pruning section 2113 by using the arithmetic units and DNN weight information identified by the coefficient identifying section 2110 and the compression rate correction table 204. The compression rate correction table 204 is information used for deciding a correction value of the compression rate.

FIG. 15 is a diagram illustrating one example of the compression rate correction table 204. The compression rate correction table 204 is a table for associating the number 140 of arithmetic units greatly involved in the important dataset with a compression rate 141 and managing them. In the field of the number 140 of arithmetic units relating to the important dataset, the number of arithmetic units greatly involved in the important dataset is described. In the field of the compression rate 141, the compression rate used at the time of compression is described. The compression rate is percentage information that represents the degree at which DNN weights are pruned in units of layer of the neural network. For example, when the specified value of the compression rate is set to 20%, the DNN weights of the layer are pruned by 20%.

In the example of the compression rate 141, description is made on the assumption that correction is carried out through multiplication and division for the originally-set compression rate. However, the compression rate may be set by another measure such as bit-shift operation or addition and subtraction. Furthermore, the compression rate may be set with an absolute value like 10% and 20%. In the case of using the compression rate correction table 204, when the number of arithmetic units identified by the coefficient identifying section 2110 becomes equal to 25 in an optional layer of the neural network, for example, the compression rate of the layer becomes the compression rate obtained by dividing the normal compression rate by 2 through use of this table information. Although processing in units of layer is described in the present example, an optional unit of processing in the neural network other than the unit of layer may be employed.

The above-described respective embodiments and modification examples may be combined with each other. Although the various embodiments and modification examples are explained in the above description, the present invention is not limited to the contents of them. Other aspects that are conceivable in the range of technical ideas of the present invention are also included in the range of the present invention.

The contents of disclosure of the following basic patent application for priority are incorporated herein as reference.

Japanese Patent Application No. 2018-168864 (filed on Sep. 10, 2018)

DESCRIPTION OF REFERENCE CHARACTERS

100: Arithmetic unit
2: Neural network update system
20: Storing part
21: Server
22: Electronic control device
23: Network 200: Pre-compression neural network model
201: Post-compression neural network model
202: Important dataset
203: Normal dataset
204: Compression rate correction table
210: Arithmetic part
220: Storing part
221: Arithmetic part
2000: First connection information group
2010: Third connection information group
2110: Coefficient identifying section
2111: Operation coefficient deciding section
2112: Coefficient group calculating section
2113: Pruning section
2114: NN execution control section
2115: NN model training control section
2116: Compression rate correcting section
2120: Second connection information group
2200: Post-compression NN model
2210: CPU
22001: Network structure information
30, 31: Dataset management table

The invention claimed is:

1. An electronic control device that stores a neural network including a plurality of neurons and a connection information group including a plurality of pieces of connection information that associate the neurons with each other, wherein
the neural network is a neural network including a third connection information group created through deletion, by a pruning section, of at least one piece of connection information from a first connection information group for deciding an output value when an input value is given on a basis of the first connection information group and a second connection information group that is a plurality of pieces of the connection information having a degree of influence on predetermined data given as the input value, the degree of influence exceeding a predetermined value.

2. The electronic control device according to claim 1, wherein
the predetermined data is data in which priority relating to vehicle traveling exceeds a predetermined value.

3. The electronic control device according to claim 2, wherein
the pruning section decides an operation coefficient group that is a collection of operation coefficients corresponding to respective pieces of the connection information included in the second connection information group, and multiplies the connection information that is included in the first connection information group and corresponds by each of the operation coefficients to calculate an evaluation coefficient and make an evaluation coefficient group, and the pruning section identifies the connection information that corresponds, from the first connection information group, regarding the evaluation coefficient that exceeds a predetermined value in the evaluation coefficient group, and deletes the connection information other than the identified connection information from the first connection information group to create the third connection information group.

4. The electronic control device according to claim 3, wherein
a coefficient identifying section identifies, in the plurality of neurons, a neuron involved in decision of the output value if the output value when the predetermined data is given exceeds a predetermined value, and identifies connection information associated with the identified neuron as the connection information that configures the second connection information group.

5. The electronic control device according to claim 1, wherein
the third connection information group is the connection information group obtained through deletion of at least one piece of connection information from the first connection information group by the pruning section and optimization by fine tuning.

6. A neural network update system that includes a server and an electronic control device and updates a neural network including a plurality of neurons and a connection information group including a plurality of pieces of connection information that associate the neurons with each other, wherein
the server includes a storing part and an arithmetic part,
the storing part stores a first connection information group for deciding an output value when an input value is given,
the arithmetic part includes
a coefficient identifying section that identifies a second connection information group that is a plurality of pieces of the connection information having a degree of influence on predetermined data, the degree of influence exceeding a predetermined value, when the predetermined data is given as the input value, and
a pruning section that deletes at least one piece of connection information from the first connection information group to create the third connection information group on a basis of the first connection information group and the second connection information group, and
the electronic control device stores a neural network including the third connection information group.

7. The neural network update system according to claim 6, wherein
the predetermined data is data in which priority relating to vehicle traveling exceeds a predetermined value.

8. The neural network update system according to claim 7, wherein
the pruning section decides an operation coefficient group that is a collection of operation coefficients corresponding to respective pieces of the connection information included in the second connection information group and multiplies the connection information that is included in the first connection information group and corresponds by each of the operation coefficients to calculate an evaluation coefficient and make an evaluation coefficient group, and the pruning section identifies the connection information that corresponds, from the first connection information group, regarding the evaluation coefficient that exceeds a predetermined value in the evaluation coefficient group, and deletes the connection information other than the identified connection information from the first connection information group to create the third connection information group.

9. The neural network update system according to claim 8, wherein
the coefficient identifying section identifies, in the plurality of neurons, a neuron involved in decision of the output value if the output value when the predetermined data is given exceeds a predetermined value, and identifies connection information associated with the identified neuron as the connection information that configures the second connection information group.

10. The neural network update system according to claim 6, wherein
the pruning section deletes at least one piece of connection information from the first connection information group and optimizes the connection information group by fine tuning to create the third connection information group.

* * * * *